US012689022B2

(12) United States Patent
Shin et al.

(10) Patent No.: US 12,689,022 B2
(45) Date of Patent: Jul. 21, 2026

(54) METHOD OF MANUFACTURING AN ELECTRODE COMPRISING A DRY ELECTRODE FILM AND AN ELECTRODE FOR AN ELECTROCHEMICAL DEVICE THEREFROM

(71) Applicant: LG Energy Solution, Ltd., Seoul (KR)

(72) Inventors: Dong-Mok Shin, Daejeon (KR);
Sang-Min Kwak, Daejeon (KR);
Dong-Oh Shin, Daejeon (KR);
Kwang-Ho Yoo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 675 days.

(21) Appl. No.: 17/957,169

(22) Filed: Sep. 30, 2022

(65) Prior Publication Data

US 2023/0114069 A1     Apr. 13, 2023

(30) Foreign Application Priority Data

Aug. 31, 2021    (KR) ........................ 10-2021-0115943
Aug. 31, 2022    (KR) ........................ 10-2022-0110411

(51) Int. Cl.
*H01M 4/36*        (2006.01)
*B60L 50/64*       (2019.01)
*H01M 4/04*        (2006.01)
*H01M 4/62*        (2006.01)
*H01M 10/0525*     (2010.01)

(52) U.S. Cl.
CPC ............. *H01M 4/364* (2013.01); *B60L 50/64*
(2019.02); *H01M 4/0435* (2013.01); *H01M*
*4/623* (2013.01); *H01M 10/0525* (2013.01);
*H01M 2220/20* (2013.01)

(58) Field of Classification Search
CPC ........ H01M 4/04; H01M 4/0435; H01M 4/36;
H01M 4/364; H01M 4/62; H01M 4/623;
H01M 10/0525; H01M 2220/20; B60L
50/64
USPC ........................................................ 429/209
See application file for complete search history.

(56) References Cited

U.S. PATENT DOCUMENTS

| | | |
|---|---|---|
| 8,815,443 B2 | 8/2014 | Mitchell et al. |
| 11,165,053 B2 | 11/2021 | Zhang et al. |
| 2003/0009868 A1* | 1/2003 | Jung ................... G02F 1/13439 156/345.43 |
| 2005/0266298 A1 | 12/2005 | Mitchell et al. |

(Continued)

FOREIGN PATENT DOCUMENTS

| | | |
|---|---|---|
| JP | 2001230158 A | 8/2001 |
| KR | 101211968 B1 | 12/2012 |

(Continued)

*Primary Examiner* — Kevin P Kerns
(74) *Attorney, Agent, or Firm* — Lerner David LLP

(57) ABSTRACT

Disclosed is a method for manufacturing a dry electrode. The method includes buffing the surface of a pre-electrode film formed in a sheet-like shape to remove the surface waviness in the manufacture of an electrode film, and then carrying out a calendering process, thereby ensuring the uniformity of the electrode film thickness and electrode active material density in the electrode film. In other words, it is possible to minimize a deviation in loading amount, porosity and thickness of the electrode depending on the location, and thus to provide improved overall electrochemical performance, including improved battery life characteristics.

14 Claims, 6 Drawing Sheets

(56) References Cited

U.S. PATENT DOCUMENTS

| | | | | |
|---|---|---|---|---|
| 2017/0040591 A1* | 2/2017 | Nakano | ............... | H01M 4/0404 |
| 2017/0352874 A1* | 12/2017 | Hosono et al. | ..... | H01M 4/0469 |
| 2019/0237748 A1 | 8/2019 | Shin et al. | | |
| 2019/0305316 A1 | 10/2019 | Wang et al. | | |
| 2020/0227722 A1 | 7/2020 | Bogenstahl et al. | | |
| 2021/0020898 A1 | 1/2021 | Lee et al. | | |
| 2021/0193398 A1 | 6/2021 | Raman et al. | | |
| 2021/0249657 A1 | 8/2021 | Shin et al. | | |

FOREIGN PATENT DOCUMENTS

| | | | |
|---|---|---|---|
| KR | 20180119158 | A | 11/2018 |
| KR | 20190078576 | A | 7/2019 |
| KR | 20190109284 | A | 9/2019 |
| KR | 20200090744 | A | 7/2020 |
| KR | 20200138263 | A | 12/2020 |
| KR | 20210005566 | A | 1/2021 |

* cited by examiner

ELECTRODE MIXTURE
POWDER

PRE-ELECTRODE
FILM

ELECTRODE MIXTURE
POWDER

PRE-ELECTRODE
FILM

Calendar
Roll

Calendar
Roll

FIG. 6

| THICKNESS (µm) | EX. 1 | | EX. 2 | | EX. 1 | | COMP. EX. 2 | |
|---|---|---|---|---|---|---|---|---|
| | PRE-ELECTRODE FILM | DRY ELECTRODE FILM | PRE-ELECTRODE FILM | DRY ELECTRODE FILM | PRE-ELECTRODE FILM | DRY ELECTRODE FILM | PRE-ELECTRODE FILM | DRY ELECTRODE FILM |
| 1 | 298 | 190 | 324 | 220 | 300 | 190 | 342 | 223 |
| 2 | 299 | 188 | 320 | 223 | 310 | 187 | 353 | 234 |
| 3 | 299 | 191 | 329 | 223 | 305 | 185 | 358 | 230 |
| 4 | 300 | 190 | 322 | 222 | 308 | 192 | 347 | 226 |
| 5 | 296 | 192 | 323 | 221 | 296 | 194 | 358 | 228 |
| 6 | 295 | 191 | 326 | 222 | 294 | 188 | 361 | 231 |
| 7 | 299 | 189 | 324 | 223 | 290 | 190 | 362 | 229 |
| 8 | 298 | 188 | 324 | 223 | 292 | 195 | 349 | 223 |
| 9 | 297 | 189 | 326 | 224 | 309 | 188 | 339 | 224 |

FIG. 7

| ELECTRODE RESISTANCE (Ohm·cm) | EX. 1 DRY ELECTRODE FILM | EX. 2 DRY ELECTRODE FILM | COMP. EX. 1 DRY ELECTRODE FILM | COMP. EX. 2 DRY ELECTRODE FILM |
|---|---|---|---|---|
| 1 | 22.5 | 26.33 | 22.34 | 26.54 |
| 2 | 25.4 | 26.31 | 20.4 | 26.21 |
| 3 | 24.21 | 26.32 | 27.3 | 26.34 |

FIG. 8

| INTERFACIAL RESISTANCE (Ohm·cm) | EX. 1 | EX. 2 | COMP. EX. 1 | COMP. EX. 2 |
|---|---|---|---|---|
| | DRY ELECTRODE FILM | DRY ELECTRODE FILM | DRY ELECTRODE FILM | DRY ELECTRODE FILM |
| 1 | 0.121 | 0.284 | 0.1231 | 0.276 |
| 2 | 0.132 | 0.295 | 0.1121 | 0.334 |
| 3 | 0.122 | 0.31 | 0.1322 | 0.245 |

METHOD OF MANUFACTURING AN ELECTRODE COMPRISING A DRY ELECTRODE FILM AND AN ELECTRODE FOR AN ELECTROCHEMICAL DEVICE THEREFROM

CROSS-REFERENCE TO RELATED APPLICATIONS

The present application claims priority to Korean Patent Application No. 10-2021-0115943 filed on Aug. 31, 2021 and Korean Patent Application No. 10-2022-0110411 filed on Aug. 31, 2022 in the Republic of Korea, the disclosures of which are incorporated herein by reference.

TECHNICAL FIELD

The present disclosure relates to a method for manufacturing an electrode for an electrochemical device including a dry electrode film. The present disclosure also relates to an electrode for an electrochemical device, obtained by the method and including a dry electrode film having a uniform thickness and energy density.

BACKGROUND ART

Due to a rapid increase in use of fossil fuel, there has been an increasing need for use of substitute energy and clean energy. The most actively studied field as a part of attempts to meet such a need is the field of power generation and power storage using electrochemistry. Currently, typical examples of electrochemical devices using electrochemical energy include secondary batteries, and application thereof has been extended gradually. A lithium secondary battery as a representative of such secondary batteries has been used not only as an energy source of mobile instruments but also as a power source of electric vehicles and hybrid electric vehicles capable of substituting for vehicles, such as gasoline vehicles and diesel vehicles, using fossil fuel and regarded as one of the main causes of air pollution, recently. In addition, application of such a lithium secondary battery has been extended even to a supplementary power source of electric power through the formation into a grid. A process of manufacturing such a lithium secondary battery is broadly divided into an electrode-forming step, an electrode assembly-forming step and an aging step. The electrode-forming step is further divided into an electrode mixture-mixing step, an electrode-coating step, a drying step, a pressing step, a slitting step, a winding step, or the like. Among the steps, the electrode mixture-mixing step is a step of mixing the ingredients for forming an electrode active layer configured to carry out electrochemical reactions actually in the electrode. Particularly, an electrode active material as an essential element of the electrode is mixed with a binder used for the binding of powder particles among themselves and the adhesion to a current collector, a solvent for imparting viscosity and dispersing powder, or the like, to prepare a slurry having flowability.

Such a composition mixed for forming an electrode active layer is also called an electrode mixture in a broad sense. Then, an electrode-coating step of applying the electrode mixture onto a current collector having electrical conductivity and a drying step of removing the solvent contained in the electrode mixture are carried out, and then the resultant electrode is pressed to a predetermined thickness. Meanwhile, as the solvent contained in the electrode mixture evaporates during the drying step, defects, such as pinholes or cracks, may be generated in the preliminarily formed electrode active layer. In addition, the active layer is not dried uniformly at the internal part and external part thereof, and thus a powder floating phenomenon may occur due to a difference in solvent evaporation rate. In other words, a powder present in a portion dried earlier may float, while forming a gap from a portion dried relatively later, resulting in degradation of electrode quality.

To solve the above-mentioned problems, there has been considered a drying apparatus which allows uniform drying of the internal and external parts of an active layer and can control the evaporation rate of a solvent. However, such drying apparatuses are highly expensive and require a lot of costs and times for their operation, and thus are disadvantageous in terms of manufacture processability. Therefore, recently, active studies have been conducted to manufacture a dry electrode without using any solvent.

In general, the dry electrode is obtained by laminating a free-standing type electrode film, including an electrode active material, a binder and a conductive material and prepared in the form of a film, onto a current collector. First, an electrode active material, a carbonaceous material as a conductive material and a binder capable of fibrilization are mixed by using a blender, the binder is fibrilized by imparting shear force thereto through a process, such as jet milling or kneading, and then the resultant mixture is subjected to calendering to form a film shape, thereby providing a free-standing film. However, when the electrode film is manufactured by applying a calendering process to the dry mixture, it is difficult to ensure thickness uniformity due to various reasons, including introduction uniformity of electrode mixture powder, roundness of a pressurizing roller and vibration of equipment, gap change, pressure change, or the like. In addition, even when an additional calendering process is carried out, the deviation in thickness generated at the initial stage of a powder compression process cannot be solved but is continued. To solve this, a method for increasing pressure during the calendering process has been considered. However, in this case, even though the deviation in thickness is solved, there is a problem in that the electrode has non-uniform energy density as a whole. Therefore, there is a need for developing a novel method for manufacturing a dry electrode capable of solving the above-mentioned problems.

DISCLOSURE

Technical Problem

The present disclosure is designed to solve the problems of the related art, and therefore the present disclosure is directed to providing a method for manufacturing an electrode including a dry electrode film having a uniform thickness and energy density. The present disclosure is also directed to providing an electrode for an electrochemical device obtained by the method.

Technical Solution

According to the first embodiment of the present disclosure, there is provided a method for manufacturing a dry electrode, including the steps of:

(S10) a compressing step of compressing an electrode mixture powder for manufacturing a dry electrode film to be processed into a sheet-like pre-electrode film having a predetermined thickness;

(S20) a buffing step of buffing one surface or both surfaces of the pre-electrode film obtained from step (S10); and (S30) a calendering step of calendering the pre-electrode film buffed from step (S20) to obtain a dry electrode film.

According to the second embodiment of the present disclosure, there is provided the method for manufacturing a dry electrode as defined in the first embodiment, wherein the dry electrode film obtained from step (S30) shows a standard deviation in thickness of less than 2.5 μm, as determined by measuring thicknesses at multiple optional points.

According to the third embodiment of the present disclosure, there is provided the method for manufacturing a dry electrode as defined in the second embodiment, wherein the dry electrode film obtained from step (S30) shows a difference ($|T_{Max}-T_{Min}|$) between the maximum thickness ($T_{Max}$) and the minimum thickness ($T_{Min}$) of less than 5 μm, as determined by measuring thicknesses at multiple optional points.

According to the fourth embodiment of the present disclosure, there is provided the method for manufacturing a dry electrode as defined in the first embodiment, wherein the electrode mixture powder includes an electrode active material, a conductive material and a binder resin, and the binder resin has been subjected to a micro-fibrilization process.

According to the fifth embodiment of the present disclosure, there is provided the method for manufacturing a dry electrode as defined in the fourth embodiment, wherein the binder resin includes polyterafluoroethylene (PTFE).

According to the sixth embodiment of the present disclosure, there is provided the method for manufacturing a dry electrode as defined in any one of the first to the fifth embodiments, wherein step (S10) is carried out by using a powder compression molding device which includes a roll pressing unit including two pressurizing rollers facing each other, and the electrode mixture powder is introduced between the pressurizing rollers.

According to the seventh embodiment of the present disclosure, there is provided the method for manufacturing a dry electrode as defined in any one of the first to the sixth embodiments, wherein the calendering in step (S30) is carried out by using a calendering device which includes a roll pressing unit including two pressurizing rollers facing each other, and the pre-electrode film is pressed by the roll pressing unit.

According to the eighth embodiment of the present disclosure, there is provided the method for manufacturing a dry electrode as defined in the seventh embodiment, wherein the calendering device includes two or more roll pressing units, and the pre-electrode film is calendered by being passed through the roll pressing units in multiple steps by the two or more roll pressing units.

According to the ninth embodiment of the present disclosure, there is provided the method for manufacturing a dry electrode as defined in any one of the first to the eighth embodiments, wherein the buffing in step (S20) is carried out by allowing a buffing member to be in contact with one surface of the pre-electrode film so that the pre-electrode film may be buffed from the surface to a predetermined depth.

According to the tenth embodiment of the present disclosure, there is provided the method for manufacturing a dry electrode as defined in the ninth embodiment, wherein a backup member is disposed at a position corresponding to the buffing member on the other surface of the pre-electrode film to pressurize and support the pre-electrode film in the direction of the buffing member.

According to the eleventh embodiment of the present disclosure, there is provided the method for manufacturing a dry electrode as defined in any one of the first to the tenth embodiments, wherein the buffing in step (S20) is carried out for both surfaces of the pre-electrode film, and one surface of the pre-electrode film is subjected to the buffing step, and then the other surface thereof is subjected to the buffing step sequentially.

According to the twelfth embodiment of the present disclosure, there is provided the method for manufacturing a dry electrode as defined in the ninth embodiment, wherein the buffing member is provided with a buffing pad including a buffing material on the surface thereof.

According to the thirteenth embodiment of the present disclosure, there is provided the method for manufacturing a dry electrode as defined in any one of the first to the twelfth embodiments, wherein the dry electrode powder is obtained by a method including the steps of:

(a) preparing a powdery mixture including an electrode active material, a conductive material and a binder resin;

(b) kneading the powdery mixture at 70-200° C. to prepare mixture lumps; and (c) pulverizing the mixture lumps to obtain electrode powder.

According to the fourteenth embodiment of the present disclosure, there is provided a dry electrode film which is obtained by the method as defined in any one of the first to the thirteenth embodiments, and shows a standard deviation in thickness of less than 2.5 μm, as determined by measuring thicknesses at multiple optional points.

According to the fifteenth embodiment of the present disclosure, there is provided the dry electrode film as defined in the fourteenth embodiment, which shows a difference ($|T_{Max}-T_{Min}|$) between the maximum thickness ($T_{Max}$) and the minimum thickness ($T_{Min}$) of less than 5 μm, as determined by measuring thicknesses at multiple optional points.

According to the sixteenth embodiment of the present disclosure, there is provided an electrode for an electrochemical device which includes a current collector and a dry electrode film disposed on one surface or both surfaces of the current collector, wherein the dry electrode film is obtained by the method as defined in any one of the first to the thirteenth embodiments.

According to the seventeenth embodiment of the present disclosure, there is provided a secondary battery which includes the electrode for an electrochemical device as defined in the sixteenth embodiment, wherein the electrode is a positive electrode, and an electrode assembly including the positive electrode, a negative electrode and a separator is received in a battery casing together with a lithium-containing non-aqueous electrolyte.

Advantageous Effects

The method for manufacturing an electrode according to the present disclosure includes buffing the surface of a pre-electrode film formed in a sheet-like shape to remove the surface waviness in the manufacture of an electrode film, and then carrying out a calendering process, thereby ensuring the uniformity of the electrode film thickness and electrode active material density in the electrode film. In other words, it is possible to minimize a deviation in loading amount, porosity and thickness of the electrode depending on the location, and thus to provide improved overall electrochemical performance, including improved battery life characteristics.

DESCRIPTION OF DRAWINGS

FIG. 6 is a table illustrating the results of thickness measurement in Examples and Comparative Examples.

FIG. 7 is a table illustrating the results of electrode resistance measurement in Examples and Comparative Examples.

FIG. 8 is a table illustrating the results of interfacial resistance measurement in Examples and Comparative Examples.

BEST MODE

Figure 1:
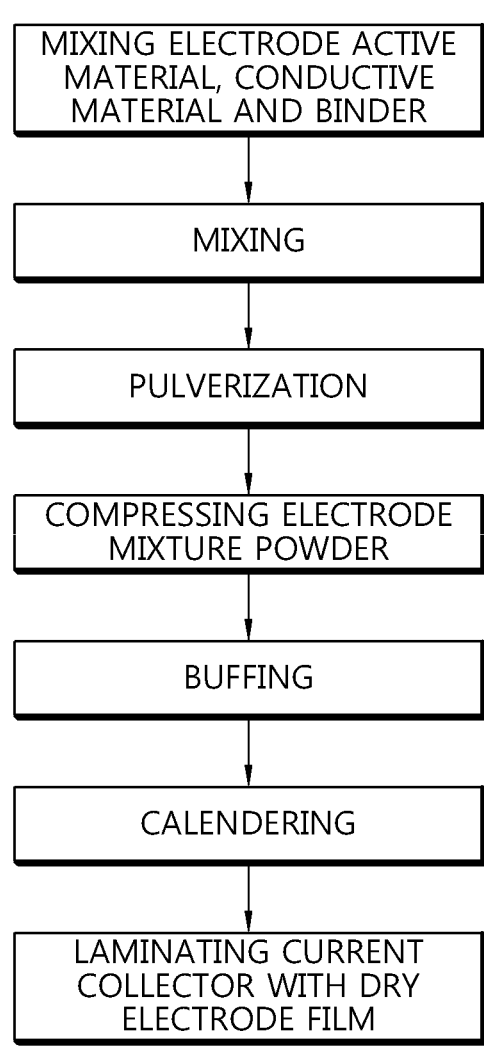
FIG. 1 is a flow chart illustrating the processing steps of the method for manufacturing a dry electrode.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

The terminology used herein is for the purpose of describing particular embodiments only and is not intended to be limiting of the present disclosure. As used herein, the singular forms 'a', 'an' and 'the' are intended to include the plural forms as well, unless the context clearly indicates otherwise.

Throughout the specification, the expression 'a part includes an element' does not preclude the presence of any additional elements but means that the part may further include the other elements.

It is apparent to those skilled in the art that the terms showing directions such as 'top', 'bottom', 'left', 'right', 'front', 'rear', 'inside' and 'outside' are used for the convenience of explanation and may vary depending on the location of the reference object or the location of the observer.

The present disclosure relates to a method for manufacturing an electrode including a free-standing type dry electrode film. As described hereinafter, the electrode film is obtained by a process for manufacturing a dry electrode. As used herein, the term 'free-standing' refers to an object which can maintain its own shape without relying on other members and can be handled by itself.

Meanwhile, the electrode film may be applied to an electrode for an electrochemical device. Particular examples of the electrochemical device include secondary batteries, particularly, lithium-ion secondary batteries.

Hereinafter, the present disclosure will be explained in more detail with reference to the accompanying drawings.

In one aspect of the present disclosure, there is provided a method for manufacturing a dry electrode, including the steps of:

(S10) a compressing step of compressing an electrode mixture powder for manufacturing a dry electrode film to be processed into a sheet-like pre-electrode film having a predetermined thickness;

(S20) a buffing step of buffing one surface or both surfaces of the pre-electrode film obtained from step (S10); and (S30) a calendering step of calendering the pre-electrode film buffed from step (S20) to obtain a dry electrode film.

According to the present disclosure, the dry electrode film is obtained by buffing the surface of a pre-electrode film to remove the surface waviness, and then carrying out a calendering process, and thus shows high thickness and density uniformity.

As used herein, the term 'surface waviness' means undulations or irregularly generated protrusions, having a longer cycle and larger amplitude as compared to surface roughness.

As used herein, the term 'pre-electrode film' refers to a compressed product molded into a sheet-like shape by compressing an electrode mixture powder in order to obtain a dry electrode film, and present in a state before the calendering process of step (S30) is carried out. The term is used for the convenience of description in order to differentiate it from the finished dry electrode film. In other words, the pre-electrode film is an intermediate to be converted into the dry electrode film according to the present disclosure by being subjected to the calendering process of step (S30).

Hereinafter, each step of the method will be explained in more detail.

First, an electrode mixture powder for preparing a dry electrode film is compressed to form a sheet-like pre-electrode film having a predetermined thickness (S10).

According to the present disclosure, the electrode mixture powder is in the state of powder which is an assembly of a plurality of microparticles. Each microparticle forming the electrode mixture includes at least one of an electrode active material, a conductive material and a binder, or a mixture of two or more ingredients selected therefrom. According to an embodiment of the present disclosure, the microparticles may have a particle diameter of 10-2,000 μm. When the microparticles satisfy the above-defined range of particle diameter, it is possible to ensure the formation of a film having a uniform thickness and density and excellent physical properties. When the particle diameter is less than 10 μm, the rollers may be contaminated with the microparticles in the calendering step, or the microparticles cannot be interconnected well by binder fibrils but isolated so that they cannot participate in film formation, and may cause degradation of physical properties, such as mechanical strength, of a finished dry electrode film. Meanwhile, when the particle diameter is larger than 2,000 μm, it is difficult to ensure the uniformity of a dry electrode film. According to an embodiment of the present disclosure, the particle diameter of microparticles may be determined through particle size distribution (PSD). Herein, PSD means the particle size distribution determined by sieve classification. For example, PSD may be determined by using a method for determining particle size distribution based on laser diffraction scattering. Particularly, in the method for determining particle size distribution based on laser diffraction scattering, a powder to be analyzed is dispersed in a dispersion medium and introduced to a commercially available laser diffraction particle size analyzer (e.g. Microtrac S3500) to measure a difference in diffraction pattern depending on particle size, when the particles pass through laser beams, and then particle size distribution is calculated.

The pre-electrode film may be prepared in the form of a sheet having a predetermined thickness. According to an embodiment of the present disclosure, the pre-electrode film is prepared through a roll-to-roll continuous process and may have a strip-like shape having an aspect ratio of larger than 1. According to an embodiment of the present disclosure, the pre-electrode film may have a thickness of 50-2,000 μm.

Figure 2:
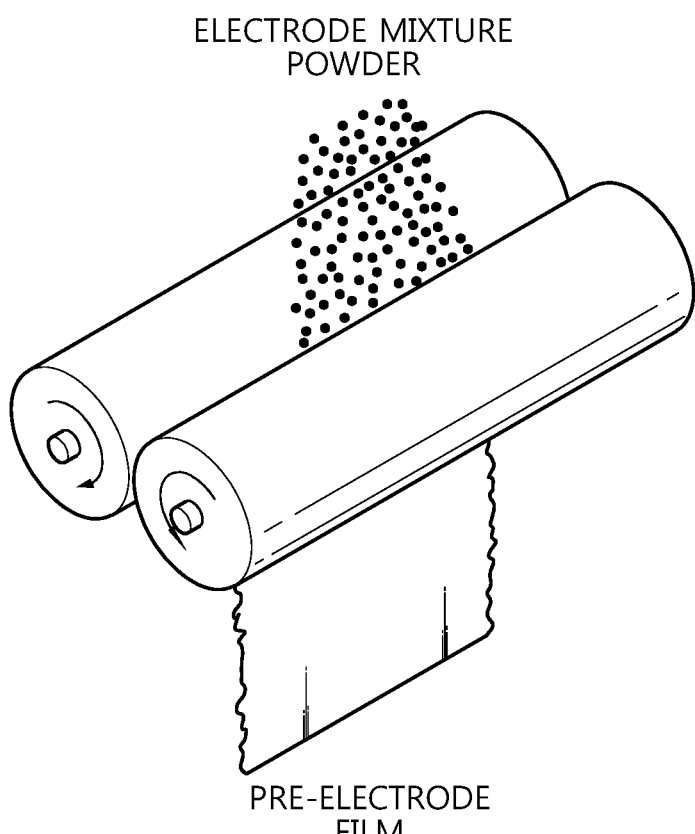
FIG. 2 is a schematic view illustrating the step of compressing a powder in the process for manufacturing a dry electrode according to an embodiment of the present disclosure.

According to an embodiment of the present disclosure, the pre-electrode film may be prepared in step (S10) by supplying the electrode mixture powder to a powder compression molding device and thermally compressing the supplied material. The powder compression molding device includes a roll pressing unit including two pressurizing rollers facing each other, and the electrode mixture powder is introduced between the pressurization rollers and is compressed by the pressurization rollers, and thus is molded into a sheet-like shape. FIG. 2 is a schematic view illustrating the compression process. Referring to FIG. 2, the electrode mixture powder is introduced between a pair of pressurizing rollers facing each other, and a sheet-like pre-electrode film is obtained through compression. According to an embodiment of the present disclosure, the rollers may be controlled to a temperature of 50-200° C. Meanwhile, according to an embodiment of the present disclosure, the pressurization rollers in the roll pressing unit may be controlled to a rotation speed ratio of 1:1-1:3.

According to an embodiment of the present disclosure, the electrode mixture powder may be supplied to the powder compression molding device through a material-introducing device (not shown) disposed in the front stream of the powder compression molding device. The material-introducing device may be provided with a container configured to receive the material, a supplying unit configured to supply the material from the outside into the container, and an ejection unit configured to supply the material from the container to a calendering device.

Meanwhile, according to an embodiment of the present disclosure, the electrode mixture powder may be prepared as follows.

First, a mixture including an electrode active material, a conductive material and a binder is prepared. Herein, the mixing for preparing the mixture is carried out in such a manner that the electrode active material, the conductive material and the binder resin may be distributed homogeneously. In addition, since the mixture is mixed in the form of powder, any mixing process capable of simple mixing of the ingredients may be used with no particular limitation, and the ingredients may be mixed through various processes. However, since the electrode is manufactured as a dry electrode using no solvent according to the present disclosure, the mixing may be carried out through a dry mixing process, and the ingredients may be introduced to an instrument, such as a blender, to carry out the mixing.

In addition, in order to ensure uniformity, the ingredients may be mixed for 30 seconds to 2 minutes under 5,000-20,000 rpm, particularly for 30 seconds to 1 minute under 10,000-15,000 rpm to prepare the electrode mixture powder.

According to the present disclosure, the binder resin is not particularly limited, as long as it can be fibrilized by the step of preparing a mixture and/or the fibrilization step as described hereinafter. The term 'fibrilization' refers to finely dividing a polymer, and may be carried out by using mechanical force, or the like. The fibrilized polymer fibers are disintegrated on their surfaces to generate a plurality of microfibers (fibrils). Non-limiting examples of the binder resin may include polytetrafluoroethylene (PTFE), polyolefin or a mixture thereof, and particularly, polytetrafluoroethylene (PTFE). More particularly, the binder resin may be polytetrafluoroethylene (PTFE). Particularly, polytetrafluoroethylene (PTFE) may be used in an amount of 60 wt % or more, based on the total weight of the binder. Meanwhile, the binder may further include polyethylene oxide (PEO), polyvinylidene fluoride (PVDF), polyvinylidene fluoride-co-hexafluoropropylene (PVDF-HFP), or the like.

The dry electrode may be a positive electrode, and the active material may be a positive electrode active material.

The positive electrode active material is not particularly limited, as long as it is provided in the form of a lithium transition metal oxide, lithium metal iron phosphorus oxide or metal oxide. Particular examples of the positive electrode active material include at least one selected from: layered compounds, such as lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M is Co, Ni, Fe, Cr, Zn or Ta, and x is 0.01-0.1) or $Li_2Mn_3MO_8$ (wherein M is Fe, Co, Ni, Cu or Zn); $LiMn_2O_4$ in which Li is partially substituted with an alkaline earth metal ion; lithium metal phosphorous oxides $LiMPO_4$ (wherein M is Fe, Co, Ni or Mn); disulfide compounds; and $Fe_2(MoO_4)_3$; or the like. However, the scope of the present disclosure is not limited thereto.

In a variant, the dry electrode may be a negative electrode, and the electrode active material may be a negative electrode active material. Particular examples of the negative electrode active material include: carbon such as non-graphitizable carbon or graphite-based carbon; metal composite oxides, such as $Li_xFe_2O_3$ ($0 \leq x \leq 1$), $Li_xWO_2$ ($0 \leq x \leq 1$) and $Sn_xMe_{1-x}Me'_yO_z$ (Me: Mn, Fe, Pb, Ge; Me': Al, B, P, Si, elements of Group 1, 2 or 3 in the Periodic Table, halogen; $0 < x \leq 1$; $1 \leq y \leq 3$; $1 \leq z \leq 8$); lithium metal; lithium alloy; silicon-based alloy; tin-based alloy; silicon oxides, such as SiO, SiO/C and $SiO_2$; metal oxides, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers, such as polyacetylene; Li—Co—Ni type materials; or the like.

Particularly, the dry electrode may be a positive electrode. Therefore, the active material may be a positive electrode active material, and particular examples thereof include lithium transition metal oxides, lithium nickel-manganese-cobalt oxides, lithium nickel-manganese-cobalt oxide partially substituted with other transition metals, etc., lithium iron phosphorus oxides, or the like.

The conductive material is not particularly limited, as long as it has conductivity while not causing any chemical change in the corresponding battery. Particular examples of the conductive material include: graphite, such as natural graphite or artificial graphite; carbon black, such as acetylene black, ketjen black, channel black, furnace black, lamp black or thermal black; conductive fibers, such as carbon fibers or metal fibers; fluorocarbon; metal powder, such as aluminum or nickel powder; conductive whisker, such as zinc oxide or potassium titanate; conductive metal oxide, such as titanium dioxide; conductive material, such as a polyphenylene derivative; or the like. Particularly, the conductive material may include at least one selected from the group consisting of activated carbon, graphite, carbon black and carbon nanotubes, and more particularly, activated carbon, with a view to homogeneous mixing of the conductive material and improvement of conductivity.

The mixing ratio of the active material, the conductive material and the binder may be 80-98 wt %: 0.5-10 wt %: 0.5-10 wt % (active material: conductive material: binder), particularly, 85-98 wt %: 0.5-5 wt %: 0.5-10 wt %.

When the binder content is excessively high beyond the above-defined range, the binder may be fibrilized excessively during the subsequent step, thereby adversely affecting the overall process. When the binder content is excessively low, it is not possible to carry out sufficient fibrilization, and thus the ingredients cannot be aggregated to such a degree that the ingredients form mixture lumps, the dry electrode film is manufactured hardly, or the physical properties of the dry electrode film is degraded undesirably.

In addition, when the content of the conductive material is excessively high beyond the above-defined range, the content of the active material is reduced relatively, resulting in a decrease in capacity. When the content of the conductive material is excessively low, sufficient conductivity cannot be ensured, or the physical properties of the dry electrode film is degraded undesirably.

Meanwhile, a filler as an ingredient for inhibiting electrode swelling may be further introduced optionally to the electrode layer. The filler is not particularly limited, as long as it is a fibrous material, while not causing any chemical change in the corresponding battery. Particular examples of the filler include: olefinic polymers, such as polyethylene or polypropylene; fibrous materials, such as glass fibers or carbon fibers; or the like.

Next, the mixture obtained as described above is subjected to a fibrilization process to fibrilize the binder resin. High-shear mixing, such as jet-mill mixing, may be used as the fibrilization process.

According to an embodiment of the present disclosure, low-shear kneading may be used as the fibrilization process. For example, the kneading may be carried out through a kneader. The binder is fibrilized by the kneading step, and the electrode active material and the conductive material powder particles are bound or interconnected by the fibrilzed binder, and thus mixture lumps having a solid content of 100% may be formed.

The kneading may be carried out at a rate controlled to 10-100 rpm. For example, the kneading may be carried out at a rate controlled to 40-70 rpm, within the above-defined range. The kneading may be carried out for 1-30 minutes. For example, the kneading may be carried out at a rate of 40-70 rpm for 3-7 minutes, within the above-defined ranges. Meanwhile, the kneading may be carried out at a shear rate controlled to 10/s to 500/s. According to an embodiment of the present disclosure, the kneading may be carried out for 1-30 minutes, and the shear rate may be controlled to a range of 30/s to 100/s.

In addition, the kneading step may be carried out under a high temperature condition. More particularly, the kneading may be carried out at 50-230° C., specifically 90-200° C.

When the kneading is carried out at a low temperature beyond the above-defined temperature range, it is not possible to perform the fibrilization of the binder during the kneading and lump formation through kneading sufficiently. As a result, it is not possible to form a film with ease during calendering. On the other hand, when the kneading is carried out at an excessively high temperature, the binder may be fibrilized rapidly, and the resultant fibers may be cut by excessive shear force, undesirably.

Meanwhile, according to an embodiment of the present disclosure, the kneading step may be carried out under a pressure equal to or higher than ambient pressure, particularly 1-3 atm, and more particularly 1.1-3 atm. When the kneading is carried out under an excessively high pressure beyond the above-defined pressure range, there are problems in that the resultant fibers may be cut due to the application of excessive shear force and pressure and the mixture lumps may have excessively increased density, undesirably.

Then, the mixture lumps obtained from the kneading step is pulverized to obtain a powdery electrode mixture.

Particularly, the lump-like mixture prepared through the kneading may be directly subjected to calendering. However, in this case, it is required to press the mixture lumps under strong pressure at high temperature to convert them into a thin film. As a result, there are problems in that the film may have excessively high density, or a uniform film cannot be obtained. Therefore, according to the present disclosure, the mixture lumps are subjected to a pulverization step to obtain a powdery electrode mixture.

Herein, the pulverization step may be carried out by using a pulverizing instrument, such as a blender or a grinder, but is not limited thereto. Particularly, the pulverization step may be carried out at a rate of 5,000-20,000 rpm for 30 seconds to 10 minutes, more particularly, at a rate of 10,000-18,000 rpm for 30 seconds to 1 minute.

When the pulverization is carried out at an excessively low rpm or for an excessively short time beyond the above-defined ranges, it is not possible to carry out pulverization sufficiently, resulting in the problem of generation of a powder having a size inadequate to form a film. When the pulverization is carried out at an excessively high rpm or for an excessively long time, a lot of fine powder may be generated from the mixture lumps undesirably.

Meanwhile, after the pre-electrode film is obtained through step (S10), a buffing step of buffing one surface or both surfaces of the pre-electrode film is carried out (S20). When an electrode mixture in the state of powder is compressed to be molded into a sheet-like shape, the sheet has non-uniform thickness depending on the location in the electrode due to various causes, such as introduction uniformity of an electrode mixture powder, roundness of a pressurizing roller and vibration of equipment, gap change, pressure change, or the like. Herein, such a deviation in thickness is referred to 'surface waviness'. Even when the pre-electrode film is subjected to a calendering process subsequently, the deviation in thickness generated at the initial stage of the powder compression step is not solved but is retained in the finished product undesirably. When high pressure is applied in order to solve the above-mentioned problem, some portions where the active material is locally concentrated are generated, even though the surface waviness is solved, resulting in non-uniformity in energy density in the electrode as a whole. Therefore, according to the present disclosure, the compressed pre-electrode film is subjected to a surface buffing process to remove the surface waviness generated during the compression process.

According to an embodiment of the present disclosure, the surface buffing process may be carried out by using a buffing member provided with a buffing pad including a buffing material on the surface thereof. The buffing member is allowed to be in contact with one surface of the pre-electrode film so that the pre-electrode film may be buffed from the surface to a predetermined depth. The buffing member is not limited to any particular ingredient or material, as long as it can buff the surface of the pre-electrode film to a predetermined depth through the friction against the pre-electrode film. For example, the buffing pad may include, as a buffing material, a sand paper, an industrial diamond buffing material, or the like.

According to an embodiment of the present disclosure, a sand paper may be used as a buffing material. For example, a sand paper having a particle size of 220-1000 grit may be used. When using a sand paper having a particle size of larger than 220 grit, the pre-electrode film may have non-uniform surface roughness. When using a sand paper having a particle size of smaller than 1000 grit, the surface buffing step requires a long period of time, or buffing cannot be performed sufficiently. However, the scope of the present disclosure is not limited thereto, and the particle size of sand paper may be selected suitably considering the particle size of electrode active material particles or that of electrode powder particles. In addition, for example, the sand paper may be made of silicon carbide, molten alumina, or the like.

Meanwhile, a backup member may be disposed at a position corresponding to the buffing member on the other surface of the pre-electrode film. The backup member pressurizes and supports the pre-electrode film in the direction of the buffing member. The backup member is used to pressurize and support the surface opposite to the buffed surface in the direction of the buffed surface so that the buffed surface to be in closer contact with the buffing member. Herein, surface waviness appears significantly on the surface to be buffed by the pressure applied from the opposite surface, and thus can be removed effectively by buffing.

According to an embodiment of the present disclosure, the surface buffing may be carried out on at least one surface of the pre-electrode film. Otherwise, the surface buffing may be carried out on both surfaces of the pre-electrode film. When both surfaces are subjected to buffing, one surface may be buffed, and then the other surface may be buffed. In addition, when the other surface is subjected to the buffing process, it is preferred that a backup member may be disposed on the surface opposite to the surface to be buffed to pressurize and support the pre-electrode film in the direction of the surface to be buffed.

According to an embodiment of the present disclosure, the distance between the buffing member and the backup member may be determined in response to the thickness of the pre-electrode film before carrying out the surface buffing process. For example, the distance may be determined as the minimum value of the thicknesses of the pre-electrode film before carrying out the surface buffing process. When the distance between the buffing member and the backup member satisfies the above-defined range, it is possible to remove the surface waviness of the pre-electrode film effectively. When the distance exceeds the above-defined range, the surface waviness of the pre-electrode film may not be removed sufficiently. On the other hand, when the distance is less than the above-defined range, the pre-electrode film may be broken. Meanwhile, according to an embodiment of the present disclosure, the processing conditions, such as the type of the buffing member and/or pressure, included in the buffing process may be controlled in such a manner that the dry pre-electrode film and finished dry electrode film may satisfy desired standard requirements.

According to an embodiment of the present disclosure, the buffing process may be controlled to such a processing condition that the standard deviation of thickness in the resultant pre-electrode film may be controlled to less than 3 µm. In addition, according to an embodiment of the present disclosure, the buffing process may be controlled to such a processing condition that the standard deviation of thickness in the resultant dry electrode film may be controlled to less than 2.5 µm, preferably less than 2 µm.

According to an embodiment of the present disclosure, the buffing process may be controlled to such a processing condition that the value of difference ($|T_{Max}-T_{Min}|$) between the maximum thickness ($T_{Max}$) and the minimum thickness ($T_{Min}$) of the resultant pre-electrode film may be controlled to less than 15 µm. In addition, according to an embodiment of the present disclosure, the buffing process may be controlled to such a processing condition that the value of difference ($|T_{Max}-T_{Min}|$) between the maximum thickness ($T_{Max}$) and the minimum thickness ($T_{Min}$) of the resultant dry electrode film may be controlled to less than 10 µm, preferably less than 5 µm.

Meanwhile, the difference ($|T_{Max}-T_{Min}|$) between the maximum thickness ($T_{Max}$) and the minimum thickness ($T_{Min}$) and the standard deviation of thickness may be calculated by measuring thicknesses at multiple optional points in each of the pre-electrode film and the dry electrode film. For example, thicknesses may be measured at least 3 points, at least 5 points, at least 7 points, or at least 9 points in each of the pre-electrode film and the dry electrode film, and then the difference and standard deviation may be calculated from the measured values.

According to an embodiment of the present disclosure, when using at least one compound represented by the chemical formula of $LiN_{1-x}M_xO_2$ as a positive electrode active material, the buffing process may be controlled to such a processing condition that the standard deviation of electrode resistance in the resultant dry electrode film may be controlled to less than 2.0 ohm·cm. In the above chemical formula, M is at least one selected from the group consisting of Co, Mn, Al, Cu, Fe, Mg, B and Ga, and x is 0.01-0.3.

According to an embodiment of the present disclosure, when using at least one compound represented by the chemical formula of $LiNi_{1-x}M_xO_2$ as a positive electrode active material, the buffing process may be controlled to such a processing condition that the standard deviation of interfacial resistance in the resultant dry electrode film may be controlled to less than 0.008 Ohm·cm. In the above chemical formula, M is at least one selected from the group consisting of Co, Mn, Al, Cu, Fe, Mg, B and Ga, and x is 0.01-0.3.

According to an embodiment of the present disclosure, when using a lithium metal phosphorus oxide $LiMPO_4$ (wherein M is Fe, Co, Ni or Mn) as a positive electrode active material, the buffing process may be controlled to such a processing condition that the standard deviation of electrode resistance in the resultant dry electrode film may be controlled to less than 0.08 Ohm cm.

According to an embodiment of the present disclosure, when using a lithium metal phosphorus oxide $LiMPO_4$ (wherein M is Fe, Co, Ni or Mn) as a positive electrode active material, the buffing process may be controlled to such a processing condition that the standard deviation of interfacial resistance in the resultant dry electrode film may be controlled to less than 0.03 Ohm·cm.

Meanwhile, the electrode resistance and interfacial resistance may be calculated by measuring thicknesses at multiple optional points in the dry electrode film. For example, thicknesses may be measured at least 3 points, at least 5 points, at least 7 points, or at least 9 points in the dry electrode film, and then the electrode resistance and interfacial resistance may be calculated from the measured values.

Figure 3:
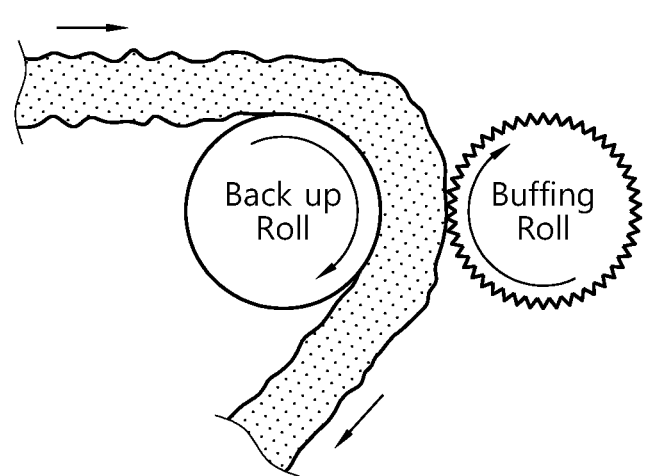
FIG. 3 is a schematic view illustrating the step of buffing the surface of a pre-electrode film in the process for manufacturing a dry electrode according to an embodiment of the present disclosure.

According to an embodiment of the present disclosure, the surface buffing may be carried out by using a buffing roller. FIG. 3 is a schematic view illustrating the buffing step according to an embodiment of the present disclosure. Referring to FIG. 3, one surface of the pre-electrode film is in contact with the buffing roller, and the surface waviness is removed by the friction against the buffing roller. During the buffing step, the pre-electrode film is conveyed through a roll-to-roll mechanism, and the buffing roller buffs the surface, while being rotated rapidly in the direction opposite to the pre-electrode film conveying direction. Meanwhile, the pre-electrode film is pressurized and supported in the direction of the buffing roller by the backup roller disposed a position corresponding to the buffing member on the other surface of the pre-electrode film.

According to an embodiment of the present disclosure, when carrying out the buffing process, the buffing roller may have a diameter of 50 pi ($\varphi$) to 300 pi ($\varphi$). When carrying out the buffing process, the roller rotation speed may be 100-2000 rpm, and the buffing rate of the buffing member may be 0.5-10 m/min.

After the deviation in thickness of the surface is eliminated by the buffing process, the pre-electrode film is subjected to calendering to obtain a free-standing type dry electrode film (S30).

The calendering is a step of pressurizing the pre-electrode film to control the thickness and to obtain a dry electrode film having a desired level of mechanical strength. According to an embodiment of the present disclosure, the thickness of the dry electrode film may be controlled suitably within a range of 50-300 μm. According to an embodiment of the present disclosure, the calendering may be carried out by using a calendering device including a roll pressing unit having two rollers facing each other.

A plurality of such roll pressing units may be disposed continuously. Herein, each roll pressing unit may be controlled suitably to a rotation speed ratio of the two rollers of 1:1-1:10 independently. For example, in at least one roll pressing unit, the rotation speed ratio of the two rollers may be controlled to 1:1-1:3. The calendaring process may be carried out once, twice or more until the dry electrode film has a desired thickness. Meanwhile, according to an embodiment of the present disclosure, the roller may be controlled to a temperature of 50-200° C.

Figure 4:
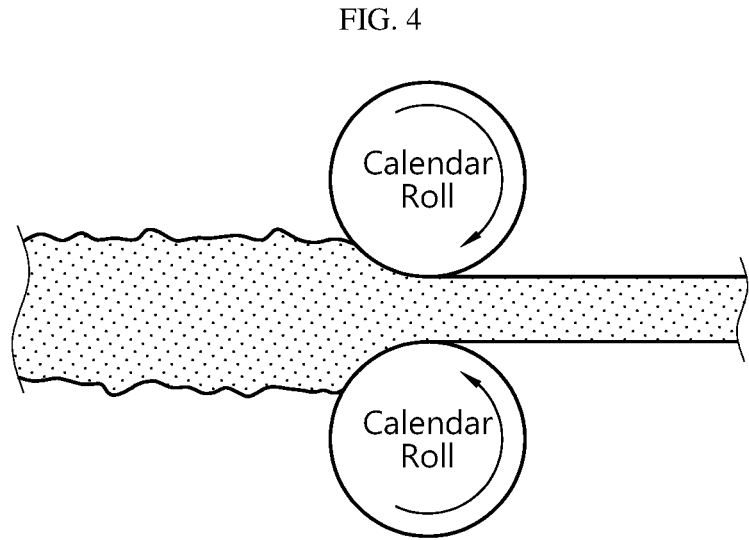
FIG. 4 is a schematic view illustrating the calendering step in the process for manufacturing a dry electrode according to an embodiment of the present disclosure.
Figure 5:
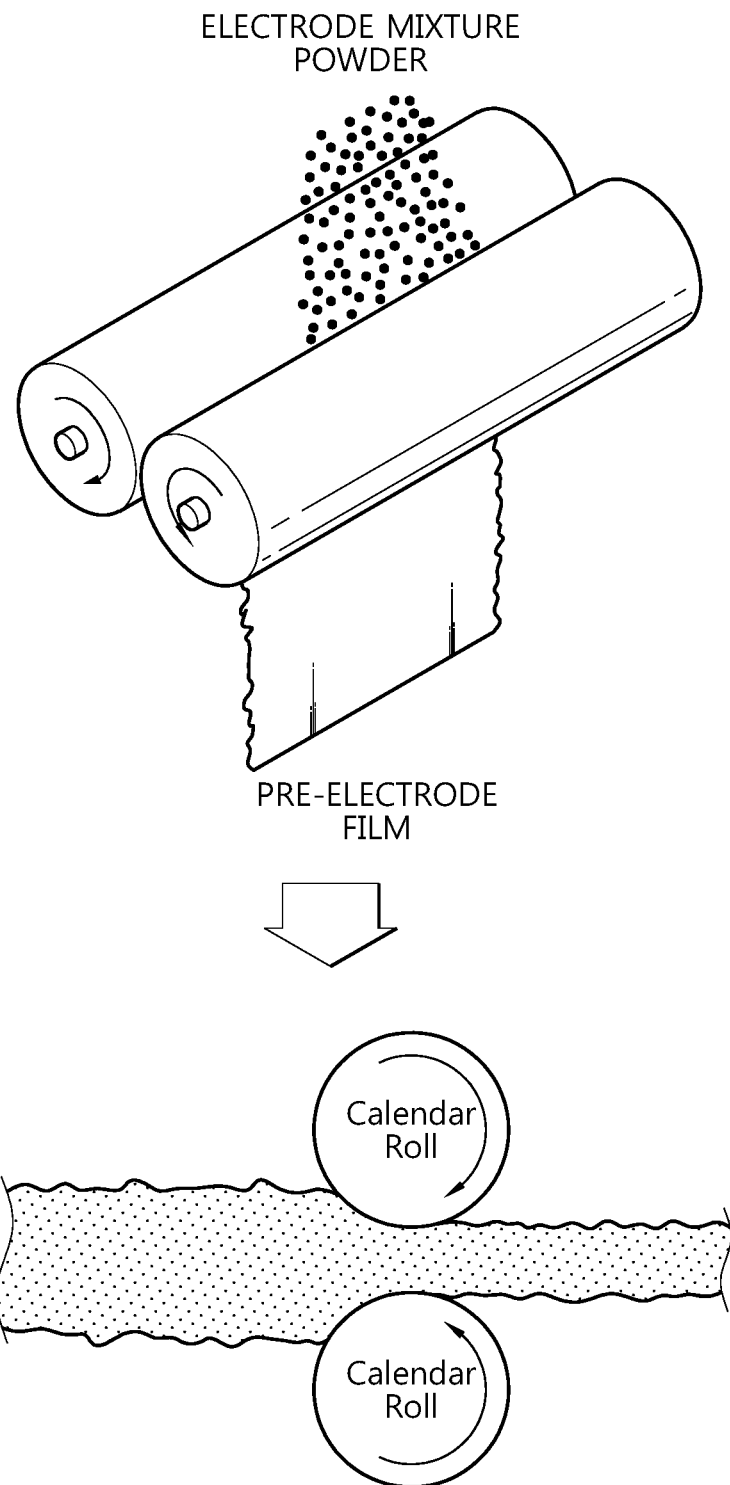
FIG. 5 is a schematic view illustrating the problem of non-uniformity in thickness of the electrode film obtained by the conventional process for manufacturing a dry electrode including no buffing step.

FIG. 4 is a schematic view illustrating the calendering step according to an embodiment of the present disclosure. Referring to FIG. 4, the pre-electrode film is controlled in thickness, while being passed through a pair of calendering rollers. Herein, the pre-electrode film is free from surface waviness through the buffing step, and a dry electrode film having high uniformity in terms of thickness, loading amount, porosity, or the like, is obtained through the calendering step. FIG. 5 illustrates a method for manufacturing a dry electrode film according to the related art, wherein a pre-electrode film is manufactured through powder compression, and then a calendering step is carried out with no buffing step. In this case, even when the calendering step is carried out, the resultant dry electrode film still has a problem of thickness deviation.

Meanwhile, the method according to the present disclosure may further include a step of stacking the electrode film on one surface or both surfaces of a current collector and laminating the resultant structure to obtain an electrode. The lamination may be a step of pressing/attaching the dry electrode film against/onto a current collector. The lamination may be carried out through a roll pressing process using a lamination roller, wherein the lamination roller may be maintained at a temperature of 20-200° C.

Meanwhile, the current collector is not particularly limited, as long as it has high conductivity, while not causing any chemical change in the corresponding battery.

Particular examples of the current collector include stainless steel, aluminum, nickel, titanium, baked carbon, aluminum or stainless steel surface-treated with carbon, nickel, titanium, silver, or the like. In addition, fine surface irregularities may be formed on the surface of the current collector to enhance the binding force with the positive electrode active material. The current collector may be used in various shapes, including a film, a sheet, a foil, a net, a porous body, a foamed body, a non-woven web, or the like.

FIG. 1 is a time series flow chart illustrating the process for manufacturing a dry electrode, including a step of manufacturing a dry electrode film, according to an embodiment of the present disclosure. Herein, an electrode mixture powder is prepared and compressed to prepare a pre-electrode film, which, in turn, is subjected to a surface buffing step and calendering step to obtain a dry electrode film. Then, the resultant dry electrode film is laminated with metal foil used as a current collector to obtain a dry electrode.

Further, the current collector may be totally or partially coated with a conductive primer in order to reduce the surface resistance and to improve the adhesion. Herein, the conductive primer may include a conductive material and a binder. The conductive material is not particularly limited, as long as it has conductivity, and particular examples thereof include carbonaceous materials. The binder may include a fluorine-based binder (including PVDF and PVDF copolymers), which is soluble in a solvent, an acrylic binder, an aqueous binder, or the like.

In another aspect of the present disclosure, there are provided a secondary battery including the dry electrode, wherein the dry electrode is a positive electrode, and an electrode assembly including the positive electrode, a negative electrode and a separator is received in a battery casing together with a lithium-containing non-aqueous electrolyte, and an energy storage system including the secondary battery as a unit cell.

In still another aspect of the present disclosure, there is provided a system for manufacturing a dry electrode. The system includes: a blender configured to mix the ingredients of an electrode mixture including an active material, a conductive material and a binder; a kneader configured to knead the mixture of the ingredients to form mixture lumps; a pulverizer configured to pulverize the mixture lumps to form electrode mixture powder; a buffing member configured to buff a pre-electrode film formed by compressing the powdery electrode mixture by using a buffing roller; a calender configured to form a dry electrode film from the pre-electrode film; an eliminator configured to remove the edge part from the dry electrode film; and a lamination roll configured to dispose the dry electrode film on at least one surface of a current collector and to carry out lamination.

The blender is a mixer configured to mix the ingredients. As described above, the ingredients of the mixture may be mixed at a rate of 5,000-20,000 rpm. The kneader is a binder fibrilization device used instead of jet-milling according to the present disclosure, and the mixture may be obtained in the form of mixture lumps through the kneading in the kneader. For this purpose, the kneader may be set to a temperature of 50-230° C. and/or a pressure condition equal to or higher than ambient pressure. For example, the kneader may be set to a temperature condition of 90-200° C. and/or a pressure condition of 1-3 atm, particularly 1.1-3 atm.

The pulverizer is configured to pulverize the obtained mixture lumps to form a powder for an electrode, and may include a blender or a grinder.

Meanwhile, reference will be made to the above description about the calender and the eliminator.

The lamination roll functions to attach the dry electrode film formed by the calender to at least one surface of the current collector and to carry out pressing.

The porosity of the dry electrode film according to the present disclosure may be determined by the calender and the lamination roll.

Meanwhile, according to an embodiment of the present disclosure, the system may include a jet-milling device, instead of the kneader and the pulverizer.

The particular structures of the blender, the kneader, the calender and the lamination roll are known to those skilled in the art, and detailed description thereof is omitted herein.

EXAMPLES

Hereinafter, the present disclosure will be explained in detail with reference to Examples, Comparative Examples and Test Examples so that the present disclosure will fully convey the scope of the present disclosure to those skilled in the art.

Example 1

A positive electrode active material, activated carbon and polytetrafluoroethylene (PTFE) were introduced to a blender at a weight ratio of 94:3:3 and mixed therein at 15,000 rpm for 1 minute to prepare a mixture. A kneader was stabilized at a temperature of 150° C., the mixture was introduced to the kneader, and then the kneader was operated at a speed of 50 rpm for 5 minutes to obtain mixture lumps. The mixture lumps were introduced to a blender and pulverized therein at 10,000 rpm for 1 minute to obtain an electrode powder. Then, the electrode powder was introduced to a powder compression molding device (roll press) (roll diameter 88 mm, roll temperature 100° C., roll speed ratio 20/24 rpm) to obtain a pre-electrode film having a thickness of 298 μm. After that, one surface of the pre-electrode film was passed through a rotary roller provided with a buffing pad including a sand paper to carry out a surface buffing process. The rotary roller had a diameter of 100 pi, and the sand paper (400 grit, SiC) was disposed on the roll surface. The roller was controlled to a rotation speed of 1,000 rpm, and the buffing speed was set to 3 m/min. Then, the electrode film was subjected to calendering by using a calender device (roll press) (roll diameter 88 mm, roll temperature 100° C., roll speed ratio 20/24 rpm) to obtain a dry electrode film having a thickness of 190 μm. The positive electrode active material was $Li(Ni_xCo_yMn_zAl_a)O_2$ (wherein x=0.880±0.010, y=0.050±0.010, z=0.070±0.010, a=0.005±0.002).

A dry electrode film was obtained in the same manner as Example 1, except that the positive electrode active material, activated carbon and polytetrafluoroethylene (PTFE) were introduced to a blender at a weight ratio of 94:1.5:4.5, and $LiFePO_4$ was used as the positive electrode active material.

Comparative Example 1

A positive electrode active material, activated carbon and polytetrafluoroethylene (PTFE) were introduced to a blender at a weight ratio of 94:3:3 and mixed therein at 15,000 rpm for 1 minute to prepare a mixture. A kneader was stabilized at a temperature of 150° C., the mixture was introduced to the kneader, and then the kneader was operated at a speed of 50 rpm for 5 minutes to obtain mixture lumps. The mixture lumps were introduced to a blender and pulverized therein at 10,000 rpm for 1 minute to obtain an electrode powder. Then, the electrode powder was introduced to a powder compression molding device (roll press) (roll diameter 88 mm, roll temperature 100° C., roll speed ratio 20/24 rpm) to obtain a pre-electrode film having a thickness of 300 μm. After that, the pre-electrode film was subjected to calendering by using a calender device (roll press) (roll diameter 88 mm, roll temperature 100° C., roll speed ratio 20/24 rpm) to obtain a dry electrode film having a thickness of 190 μm. The positive electrode active material was $Li(Ni_xCo_yMn_zAl_a)O_2$ (wherein x=0.880±0.010, y=0.050±0.010, z=0.070±0.010, a=0.005±0.002).

Comparative Example 2

A dry electrode film was obtained in the same manner as Comparative Example 1, except that the positive electrode active material, activated carbon and polytetrafluoroethylene (PTFE) were introduced to a blender at a weight ratio of 94:1.5:4.5, and $LiFePO_4$ was used as the positive electrode active material.

Determination of Thickness Deviation

Each of the dry electrode films according to Examples 1 and 2 and Comparative Examples 1 and 2 was determined in terms of thickness, thickness deviation and standard deviation. The results are shown in the following Table 1. The thickness deviation was determined by using a thickness gauge (TESA Mu-Hite), and thicknesses were measured at optional 9 points in the film area of 100×100 mm$^2$ to calculate difference ($|T_{Max}-T_{Min}|$) and standard deviation. The results of measurement of thicknesses at 9 points in each film are shown in FIG. 6.

TABLE 1

| Test | | Thickness (μm) (Average of 9 points) | Thickness deviation (Min-Max, μm) | Standard deviation (μm) |
|---|---|---|---|---|
| Ex. 1 | Pre-electrode film | 298 | 5 | 1.6 |
| | Dry electrode film | 190 | 4 | 1.4 |
| Ex. 2 | Pre-electrode film | 324 | 9 | 2.6 |
| | Dry electrode film | 222 | 4 | 1.2 |
| Comp. Ex. 1 | Pre-electrode film | 300 | 20 | 7.8 |
| | Dry electrode film | 190 | 10 | 3.3 |
| Comp. Ex. 2 | Pre-electrode film | 352 | 23 | 8.3 |
| | Dry electrode film | 228 | 11 | 3.8 |

As can be seen from Table 1, the dry electrode film according to each of Comparative Examples 1 and 2 shows a larger thickness deviation and standard deviation as compared to Examples 1 and 2.

The dry electrode films according to Examples 1 and 2 show a standard deviation of thickness of 1.4 μm and 1.2 μm, respectively, i.e. less than 2.5 μm. In addition, each dry electrode film shows a difference between the maximum thickness and the minimum thickness of 4 μm, i.e. less than 5 μm.

On the contrary, the dry electrode films according to Comparative Examples 1 and 2 show a standard deviation of thickness of 3.3 μm and 3.8 μm, respectively, i.e. larger than 2.5 μm. In addition, the dry electrode films show a difference between the maximum thickness and the minimum thickness of 10 μm and 11 μm, i.e. larger than 5 μm.

Determination of Electrode Resistance and Interfacial Resistance

Each of the dry electrode films according to Examples 1 and 2 and Comparative Examples 1 and 2 was laminated onto both surfaces of a current collector to obtain a double-sided electrode. Then, electrode resistance values and standard deviation thereof, and interfacial resistance values (between the current collector and the electrode active material layer) and standard deviation thereof were determined at 3 points in the double-sided electrode. The results are shown in the following Table 2. The electrode resistance and interfacial resistance were determined by using the system and method as described hereinafter. The results of measurement of the electrode resistance and interfacial resistance values at 3 points in the film are shown in FIG. 7 and FIG. 8, respectively.

System for determination of resistance: RM2610, Hioki Co.

Temperature: room temperature (25° C.)

Method for determination of resistance: Each of the dry electrode films according to Examples 1 and 2 and Comparative Examples 1 and 2 was laminated onto both surfaces of a current collector (e.g. aluminum foil having a thickness of 12 μm) to obtain a double-sided electrode, the electric potential of the double-sided electrode was measured, and the resistance was calculated.

TABLE 2

| | | Electrode resistance (Ohm · cm) | | Interfacial resistance (Ohm · cm$^2$) | |
|---|---|---|---|---|---|
| Test | | Average of 3 points | Standard deviation | Average of 3 points | Standard deviation |
| Ex. 1 | Dry electrode film | 24 | 1.5 | 0.125 | 0.006 |
| Ex. 2 | Dry electrode film | 26.3 | 0.01 | 0.296 | 0.013 |
| Comp. Ex. 1 | Dry electrode film | 23 | 3.6 | 0.122 | 0.01 |
| Comp. Ex, 2 | Dry electrode film | 26.36 | 0.166 | 0.285 | 0.045 |

As can be seen from Table 2, in the case of the dry electrode film according to Comparative Example 1, even though it uses the same positive electrode active material as Example 1, it shows a larger standard deviation of electrode resistance and standard deviation of interfacial resistance, as compared to Example 1. In addition, in the case of the dry electrode film according to Comparative Example 2, even though it uses the same positive electrode active material as Example 2, it shows a larger standard deviation of electrode resistance and standard deviation of interfacial resistance, as compared to Example 2. In other words, it can be seen that each of the dry electrode films according to Comparative Examples 1 and 2 shows a larger deviation in thickness or porosity depending on the location in the electrode, as compared to Examples 1 and 2.

What is claimed is:

1. A method for manufacturing a dry electrode, comprising:
   (S10) compressing an electrode mixture powder for manufacturing a dry electrode film to be processed into a sheet-shaped pre-electrode film having a predetermined thickness;
   (S20) buffing one surface or both surfaces of the pre-electrode film transverse to the predetermined thickness of the pre-electrode film obtained from step (S10) so as to reduce a surface waviness of the one surface or the both surfaces of the pre-electrode film; and
   (S30) calendering the pre-electrode film buffed from step (S20) to obtain the dry electrode film.

2. The method of claim 1, wherein the dry electrode film obtained from step (S30) shows a standard deviation in thickness of less than 2.5 μm.

3. The method of claim 2, wherein the dry electrode film obtained from step (S30) shows a difference ($|T_{Max}-T_{Min}|$) between a maximum thickness ($T_{Max}$) and a minimum thickness ($T_{Min}$) of less than 5 μm.

4. The method of claim 1, wherein the electrode mixture powder comprises an electrode active material, a conductive material, and a binder resin, and the binder resin has been subjected to a micro-fibrilization process.

5. The method of claim 4, wherein the binder resin comprises polytetrafluoroethylene (PTFE).

6. The method of claim 1, wherein the compressing is carried out by using a powder compression molding device which comprises a roll pressing unit comprising two pressurizing rollers facing each other, and the electrode mixture powder is introduced between the pressurizing rollers.

7. The method of claim 1, wherein the calendering is carried out by using a calendering device which comprises a roll pressing unit comprising two pressurizing rollers facing each other, and the pre-electrode film is pressed by the roll pressing unit.

8. The method of claim 7, wherein the calendering device comprises two or more roll pressing units, and the pre-electrode film is calendered by being passed through the roll pressing units in multiple steps by the two or more roll pressing units.

9. The method of claim 1, wherein the buffing is carried out by allowing a buffing member to be in contact with one surface of the pre-electrode film so that the pre-electrode film is buffed from the one surface to a predetermined depth.

10. The method of claim 9, wherein a backup member is disposed at a position corresponding to the buffing member on the other surface of the pre-electrode film to pressurize and support the pre-electrode film in a direction of the buffing member.

11. The method of claim 9, wherein the buffing member is provided with a buffing pad comprising a buffing material on the surface thereof.

12. The method of claim 1, wherein the buffing is carried out for both surfaces of the pre-electrode film, and one surface of the pre-electrode film is subjected to buffing, and then the other surface thereof is subjected to the buffing sequentially.

13. The method of claim 1, wherein the dry electrode powder is obtained by:
   (a) preparing a powdery mixture comprising an electrode active material, a conductive material, and a binder resin;
   (b) kneading the powdery mixture at 70-200° C. to prepare mixture lumps; and (c) pulverizing the mixture lumps to obtain an electrode powder.

14. A method for manufacturing a dry electrode, comprising:

(S10) compressing an electrode mixture powder for manufacturing a dry electrode film to be processed into a sheet-shaped pre-electrode film having a predetermined thickness;

(S20) buffing one surface or both surfaces of the pre-electrode film transverse to the predetermined thickness of the pre-electrode film obtained from step (S10) so as to reduce a surface waviness of the one surface or the both surfaces of the pre-electrode film; and (S30) calendering the pre-electrode film buffed from step (S20) to obtain the dry electrode film, wherein the buffing is carried out by allowing a buffing member to be in contact with one surface of the pre-electrode film so that the pre-electrode film is buffed from the one surface to a predetermined depth, and wherein a backup member is disposed at a position corresponding to the buffing member on the other surface of the pre-electrode film to pressurize and support the pre-electrode film in a direction of the buffing member.

\*   \*   \*   \*   \*